Nov. 15, 1927.
H. H. MACOMBER
1,649,171
PUMPING INSTALLATION
Filed July 20, 1923
2 Sheets-Sheet 1
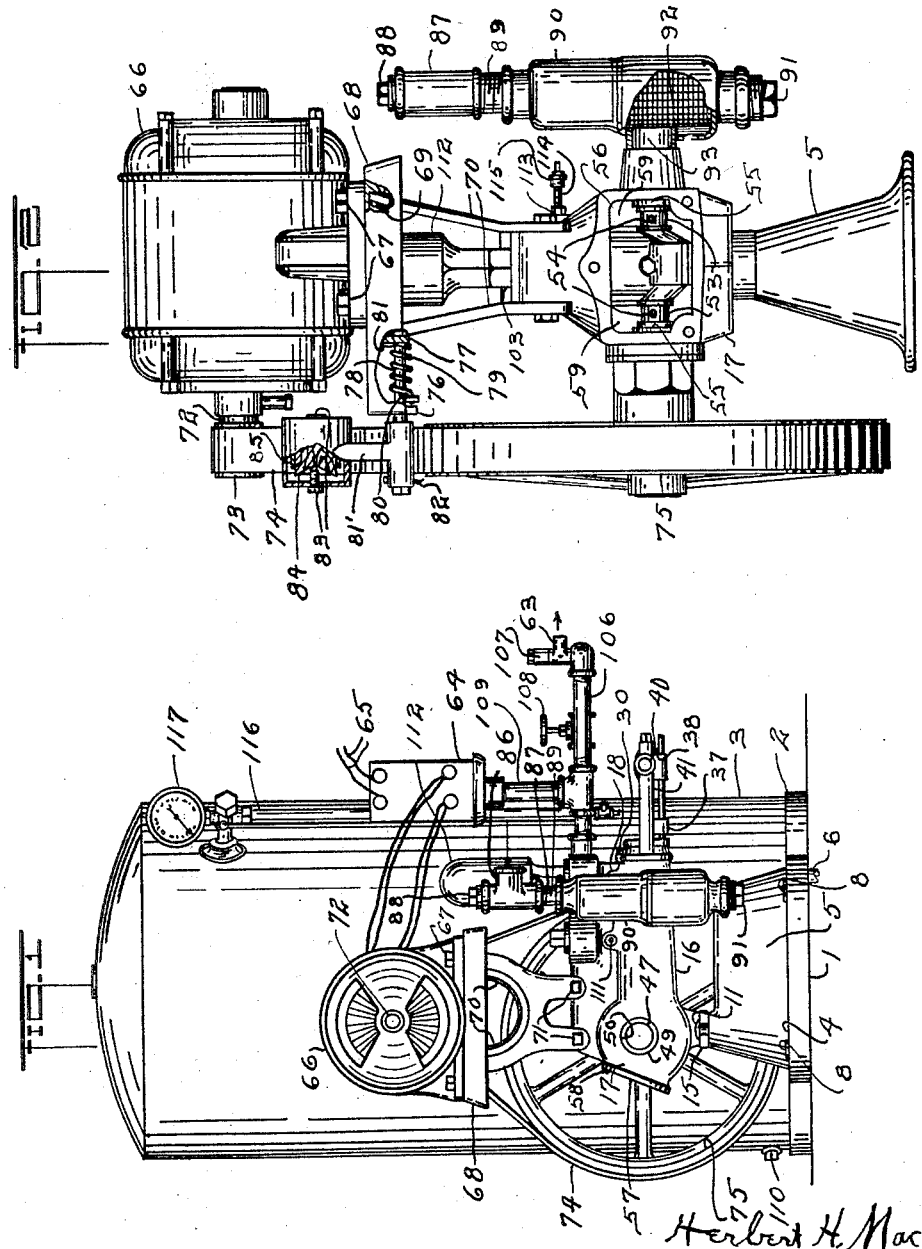

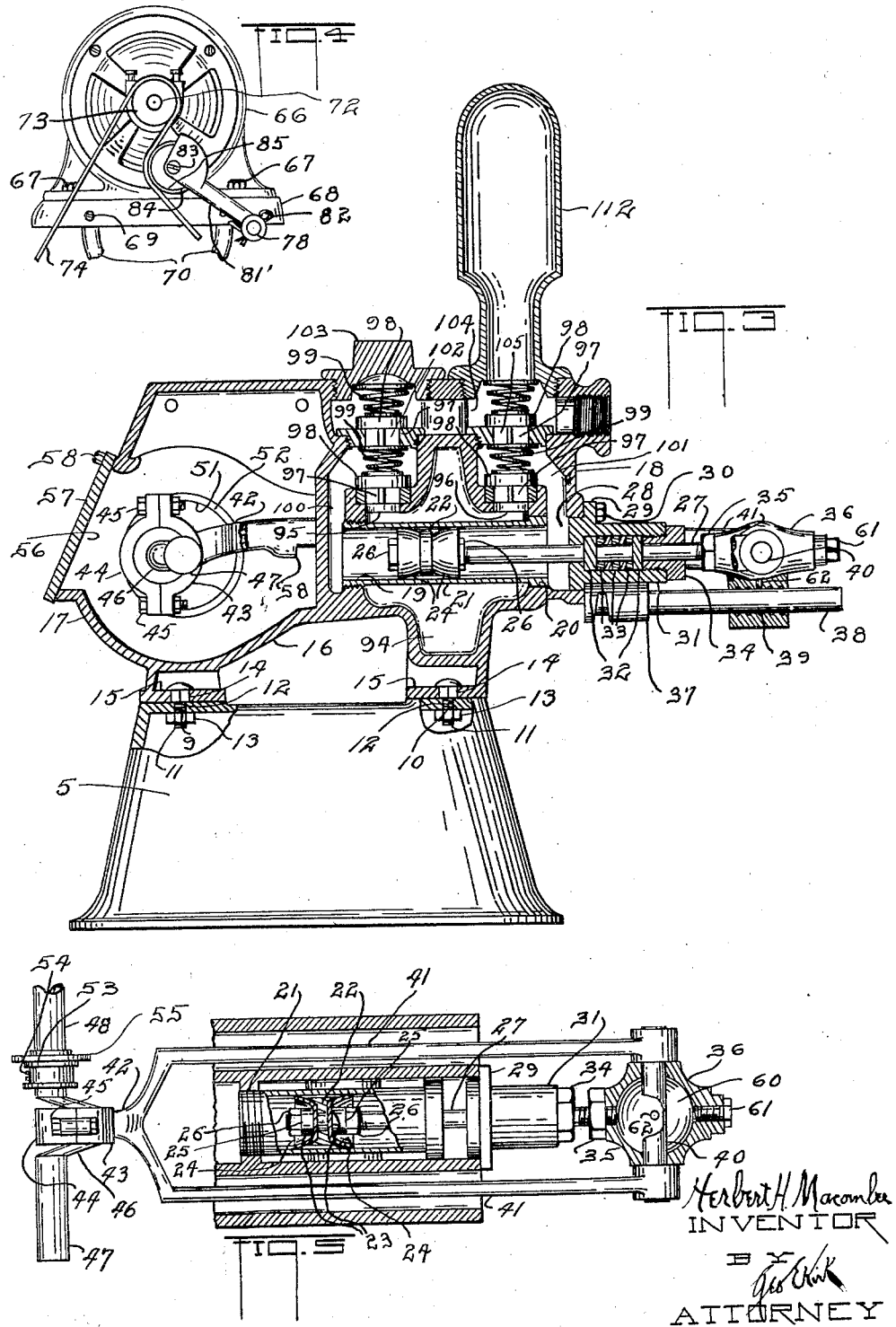

Patented Nov. 15, 1927.

1,649,171

UNITED STATES PATENT OFFICE.

HERBERT H. MACOMBER, OF KENDALLVILLE, INDIANA, ASSIGNOR TO FLINT & WALLING MFG. CO., OF KENDALLVILLE, INDIANA, A CORPORATION OF INDIANA.

PUMPING INSTALLATION.

Application filed July 20, 1923. Serial No. 652,796.

This invention relates to pump installations of the automatic type.

This invention has utility when incorporated as an electric motor pumping unit, especially for domestic service, and as including features minimizing upkeep attention.

Referring to the drawings:

Fig. 1 is a side elevation of an embodiment of the invention as an electric motor driven pump with the tank of a pneumatic water pressure installation;

Fig. 2 is a view from the crank end of the pump, parts being removed and broken away;

Fig. 3 is a medial longitudinal vertical section of the pump;

Fig. 4 is a detail view of the belt tightener; and

Fig. 5 is a plan view of the pump operating elements.

Base or pan 1 is provided with circular section 2 providing a seat for tank 3. This pan 1 has within its upstanding flange region a second seat section 4, for pump base 5. A drain pipe 6 from this pan 1 is thus effective to take any leakage, sweat, or other liquid accumulation, insuring a cleanly base for the installation as well as permitting factory set up. The pump base 5 may be anchored to the pan or main base 1 by bolts 8.

The pump base 5 has in its upper portion holes 9, 10, for carriage bolts 11, the threaded portions 12 of which extend into the hollow base 5, where nuts 13 may be run up thereon for drawing polygonal heads 14 of the bolts 11 into snugly holding position in the blocks 15 of main housing 16 of the pump.

This housing 16 embodies a crank case section 17 and a valve section 18. This valve section 18 has a pair of aligned circular seats 19, 20, for bronze cylinder 21. This cylinder 21 has a thread fit in the cylinder seat 19. In the cylinder 21 is piston 22, preferably of Babbitt or anti-friction metal, and with opposing concave seats 23 oppositely directed to carry cups or leathers 24, held in position by washers 25 and nuts 26, on piston rod 27.

In alignment with the cylinder seats 19, 20, and remote from the crank case section 17, the housing 16 has opening 28 closed by plate 29 held in position as to the housing 16 by bolts 30. This plate or gland 28 has sleeve extension 31 about the piston rod 27, to carry soft metal washers 32 and intermediate fibrous or asbestos packing 33. An externally threaded packing adjusting nut 34 coacts with the inner wall of the sleeve 31. By lock nut 35, threaded end of the piston 27 is anchored with crosshead 36. Rigid with the housing 16 and disposed below the sleeve 31 is bracket 37 in which is fixed crosshead guide bar 38 passing through way 39 on the lower side of the crosshead 34. The piston rod 27 and the bar 38 are in a common vertical plane. Transversely through the cross-head 36 is pin 40, engaging legs 41 of forked connecting rod having drop or offset end portion 42 terminating in half bearing section 43 completed by opposing half bearing section 44, held assembled therewith by bolts 45, to embrace crank 46 of shaft having aligned terminal sections 47, 48. The shaft section 47 is disposed in bearing 49 pressed into opening 50 of the housing 16. In alignment with this opening 50 is larger opening 51 carrying bearing 52 for the shaft section 48. Adjacent the crank 46, the shaft sections 47, 48, have mounted thereon collars 53, as fixed by set screws 54, fixing the crank shaft against shifting axially as to the housing. This fixing of the crank shaft is effected by adjusting the collars 53 for slight clearance as to ring oilers 55 on the shaft, adjacent the respective bearings 49, 52. This crank case section 17 of the housing 16, has opening 56, which may be closed by plate 57, assembled in position by bolts 58. Shifting or removal of this plate 57, permits access to the crank for adjustments. A lubricant supply in liquid form in this casing is effective for long maintained automatic lubrication of the pump. The crank bearing 43, 44, may dip therein. Any tendency of the lubricant to work outward along the forks 41 of the connecting rod is countered by lugs 58 from the lower sides of the forks. Furthermore, the forks 41 operate in ways 59, one on each side of and parallel to the cylinder 21. These two ways 59 are open to the crank case chamber as well as open one on each side of the gland or packing for the piston rod 27.

The crosshead 36 has therein a lubricant chamber 60, access to which is had by removing plug 61 in alignment with the piston rod 27. The lubricant in this chamber 60 is preferably a hard oil, which may lubricate the crosshead carried pin 40 as fixed with the forks 41 of the connecting rod. From this chamber 60 a duct 62 extends to the way 39 for lubricating the crosshead as to the guide bar 38. In this opposed assembly of the cylinder as to the crank case, liquid leakage from the cylinder may not dilute the oil lubricant in the crank case, nor may any water leakage from the cylinder get to the lubricant in the crosshead. These are features of economy for sustained upkeep with slight attention, giving the structure features of value for domestic installations, whether for soft water plumbing in urban homes, or for water supplies in suburban or country places.

As the pressure lowers in the tank 3, say due to water being used as drawn off from line 63, automatic switch 64, may cut in electric power from supply lines 65 for starting electric motor 66, mounted by bolts 67 upon platform 68, connected by bolts 69 to legs 70 fast with the crank case section 17, of the housing 16, by bolts 71. Inasmuch as the pump is carried upon the tank supporting base or pan 1, this mounting of the motor 66 on the pump housing, eliminates any special adjustments between the elements of this unit, for their relation is one which may be maintained for interchangeable manufacture.

The motor 66 has shaft 72 carrying pulley 73 for belt 74 extending about large pulley 75 fixed with the crank shaft section 48, which pulley 75 has its load or belt portion approximate a common plane with the bearing 52.

The sudden lurches given the belt 74 in the automatic startings of the motor 66 are effectively withstood by this substantial mounting of the driven pulley 75. However, as a yieldable element in this transmission, a tightener is introduced.

The platform 68, has aligned depending lugs 76, 77, for bar 78. Between the lugs 76, 77, on the shaft or bar 78 is torsion helical spring 79, having one end 80 thereof fast with the bar 78 and the remote end 81 of said spring 79 abutting the platform 68. Upon the portion of the bar 78 protruding beyond the platform 68 is arm 81', connected by removable split key 82 with the bar 78. This arm 81 at its free end carries a pair of opposing cone pointed screws 83 coacting with oil saturated wood block or pulley body 84 having thereabout cylindrical metal housing or pulley tread 85 coacting with the belt 74. The quick starting of the motor 66 may place a pull upon the belt 74 tending to throw the belt tightener roller 85 away from the belt 74. This give relieves the structure of excessive strains in the operation of the automatic starting mechanism. The strength of this yieldable holding of the belt 74 taut may be adjusted by removing the key 82, and placing a wrench on the flattened end of the bar 78, winding such bar up, or unwinding as may be desired as to the spring 79.

The starting of the motor 66, at once operates the pump, effecting reciprocation of the pistons 22, 23, 24, in the cylinder 21. By line 86, a water supply may be lifted or brought to the pump. Should the pump be dry, it is desirable to have it primed. To this end, the line 86 is shown as extending to T fitting 87, from the upper arm of which plug 88 may be removed for effecting priming of the pump. The occasion for this course arises only upon first starting the pump, or after it has been drained. This fitting 87 is connected by nipple 89 with chambered T fitting 90. This fitting 90 affords a vacuum chamber for the pump. From the lower side thereof, plug 91 may be removed for access to screen 92, disposed in the chamber to entrain particles from the line 86, against passing by line 93 to chamber 94 in the housing 16 below and about the cylinder 21. Just above the cylinder 21, are openings 95, 96, having therein winged guides 97 having rubber disks 98 thereon urged by helical springs 99 into closing position for the openings or intake ports 95, 96, toward the chamber 94.

One intake check valve 97, 98, is accordingly held normally in closing position for isolating the supply chamber 94 from port passage 100 between the cylinder 21 and the opening or port 95, while the other intake check valve at the port 96, isolates the cylinder 21 from port passage 101. The double acting piston, in its suction stroke tends to draw water into the cylinder 21, by unseating one intake valve. The reverse travel of the piston, say, toward the crank shaft, at once closes the port 95, and forces such water in the port passage 100 out by way of opening or valve seat 102, axially aligned with the valve seat or opening 95 of the inlet port. This outlet port or seat 102 has three-winged guide 97 therein attached to rubber disk 98, normally held against the seat 102 by spring 99 abutting plug 103 closing the valve section 18 of the housing 16 as to this aligned pair of valves comprising an intake and an outlet valve. The water as passing the opening 102, enters chamber 104. In a similar manner water taken in past the seat or intake port 96 is discharged through opening or outlet valve seat 105, directly over the port 96. From the chamber 104, the water may flow by way of line 106, thence to relief valve 107 in the line 63, having valve 108 therein normally open between the valve 107 and the reservoir or storage tank 3. Branch line 109 from the line 106 carries the switch 64, as well as communicates the tank pressure to such switch in the automatic control. The tank 3 is provided with drain plug 110. The valve chamber or port passages 100, 101, may be drained by removing plugs 111. Over the discharge port 105, is disposed air chamber 112.

Connected to the supply chamber 94 through plug 113, is air intake valve 114, of pneumatic tire valve stem type, normally closed, to be unseated by suction in the chamber 94, when valve stem cap 115 is removed. This manual control for air supply, allows replenishment of air in the tank 3 as may seem desirable in practice, the condition being disclosed by gage glass 116 and gage 117.

What is claimed and it is desired to secure by Letters Patent is:

1. A pump housing unit embodying a crank case section, a valve chamber, a cylinder seat, said unit having a pair of aligned openings for valves laterally of said cylinder seat, and an opening for a stuffing box at one end of said seat, a crank case access opening remote from said stuffing box opening, and adjacent said crank case opening a pair of aligned crank shaft openings.

2. A pump housing unit having a crank case section and a valve chamber section, a supporting base for the section, and a drive supporting sectional bracket having two sections each independently mounted directly on the crank case section independently of said base.

3. A pump housing unit having a crank case section and a valve chamber section, a supporting base for the sections, and a drive support mounted directly on the crank case section independently of said base and provided with a belt tightener mounting.

4. A pump comprising a cylinder, a piston therein, a driving shaft connected to effect relative travel between the cylinder and piston, said shaft having aligned termini and an intermediate crank, a housing providing bearings for the shaft, and axial positioning means for the shaft embodying a collar on each side of the crank, a ring adjacent the outer side of each collar, and a set screw for anchoring each collar for determining crank alignment with said piston in said cylinder.

5. A pump embodying a housing provided with a horizontally extending cylinder, a terminally open way parallel with said cylinder, a connecting rod reciprocable in said way, a piston in the cylinder connected to the rod, and driving means for the rod.

6. A pump embodying a housing, a crank shaft therein, a horizontal cylinder extending away from the shaft, a crosshead beyond the end of the cylinder remote from the shaft, a piston in the cylinder, and a connecting rod connecting the piston with the crank shaft, said housing having a way parallel with the cylinder in which the connecting rod is reciprocable.

7. A pump embodying a horizontally extending cylinder, a crank shaft at one end and a crosshead at the opposite end of said cylinder, a connecting rod from the crank shaft having a fork to extend one on each side of the cylinder to the crosshead, and a casing for the crank shaft having a way extending along the cylinder to house the connecting rod.

8. A pump embodying a horizontally extending cylinder, a crank shaft adjacent one end of the cylinder having a single crank portion, and a connecting rod extending from the single crank shaft portion and forked to extend upon opposite sides of the cylinder.

9. A pump embodying a horizontally extending cylinder, a crank shaft adjacent one end of the cylinder, a connecting rod extending from the crank shaft, and a crank casing, said connecting rod being offset downwardly adjacent the crank shaft and provided with a depending lug in said casing.

10. A pump embodying a housing having an intake chamber, an intake device to the pump from said chamber, said device having a first supply line thereto, and means from the exterior of said housing for admission of a second supply to the intake chamber isolated from said pump by the intake device including a spring set check valve as an air supply, and a closure therefor for thereby modifying pump intake.

11. A water pump, a primary intake valve for the pump, a valve of the pneumatic tire type as a supplementary intake control for the pump directly from the exterior of said pump and isolated from said pump by said primary intake valve, and a detachable cap for the pneumatic tire type of valve, said cap effective when in position to cut out its valve whereby there may be controlled operation of the pump as to such pneumatic tire type of valve.

12. A pump casing, a drive carrier thereon comprising a pair of upwardly extending independent sections, bolts mounting said sections in fixed position as to each other and the casing and a platform mounted on said sections.

13. An automatic pump installation embodying a pump having a pulley directly connected thereto, a motor having a driving pulley, a third pulley between said two pulleys, a belt with which said pulleys coact, and a yieldable take-up mounting for said third pulley to effect strain release of the belt as to coming under load upon starting of the motor resisted by said pump pulley.

14. An automatic pump installation including a pump, a belt drive therefor including a first pulley directly connected to the pump, a driving pulley, and a belt there-between, and a yieldable take-up for sudden starting of the belt as to the pump pulley and coacting with the belt embodying a belt engaging third pulley, an oil saturated wood core therefor, cone termini screws mounting the core, an arm carrying the screws, a shaft mounting the arm and a torsion spring about the shaft and normally urging the third pulley against the belt for driving connection with the first pulley against resistance of said pump.

15. A pump embodying a crosshead, a piston rod extending thereinto, a fixed guide for the crosshead in the plane of and below the piston rod, a connecting rod having aligned pivotal connections with the crosshead, a piston to which the connecting rod extends, and a cylinder in which said piston is reciprocable as to said guide.

16. A pump embodying a crosshead having a chamber therein, said crosshead having a guide bearing below the chamber and in communication with the chamber, a connecting rod mounting pin through the chamber, a piston to which the connecting rod extends, and a cylinder in which said piston is reciprocable as to said guide.

17. A pump embodying a crosshead having a chamber therein, a piston rod fixed with the crosshead, a plug aligned with the piston rod for closing the chamber, a connecting rod engaging pin rockable in the chamber, a piston to which the connecting rod extends, and a cylinder in which said piston is reciprocable.

In witness whereof I affix my signature.

HERBERT H. MACOMBER.